United States Patent [19]

Roantree et al.

[11] 4,175,540

[45] Nov. 27, 1979

[54] SOLAR ENERGY COLLECTOR

[75] Inventors: William J. Roantree; Paul S. Bartini, both of Port Washington, N.Y.

[73] Assignee: Mel Modern Systems, Incorporated, Port Washington, N.Y.

[21] Appl. No.: 797,906

[22] Filed: May 18, 1977

[51] Int. Cl.² ................................................ F24J 3/02
[52] U.S. Cl. ..................................... 126/425; 126/438
[58] Field of Search .................... 126/270, 271; 60/641

[56] References Cited

U.S. PATENT DOCUMENTS

| 1,802,635 | 4/1931 | Eaton | 126/271 |
|---|---|---|---|
| 1,853,480 | 4/1932 | Wheeler | 126/271 |
| 3,125,091 | 3/1964 | Sleeper | 126/271 |
| 3,996,917 | 12/1976 | Trihey | 126/271 |
| 4,038,964 | 8/1977 | Drew | 126/270 |
| 4,061,129 | 12/1977 | Gonzalez | 126/270 |

FOREIGN PATENT DOCUMENTS

2257067  8/1975  France ..................... 126/270

Primary Examiner—Allen M. Ostrager
Attorney, Agent, or Firm—Brooks, Haidt, Haffner & Delahunty

[57] ABSTRACT

A radiation concentrating solar energy collector and a dual axis tracking support system which positions collector units to receive the maximum incident solar radiation are disclosed. A system of pressurized air is utilized as a multiple function medium which activates the tracking mechanism, inflates and supports the reflective concentrators and acts as the heat transfer medium.

15 Claims, 11 Drawing Figures

SOLAR ENERGY COLLECTOR

BACKGROUND OF THE INVENTION

1. Field of the Invention

The invention relates to the collecting of radiant solar energy and more particularly to the concentrating type of solar energy collection.

2. Description of Prior Art

Concern about the limits of conventional energy sources has created renewed interest in one of the oldest areas of energy technology, the collection and use as heat of solar energy. To mention some of the existing solar energy collection systems, there are flat plate collectors used as solar stills; cylindrical and parabolic collector troughs; conical concentrators and sun-following paraboloidal concentrators.

Simple flat plate collectors in widespread use for domestic water heating require favorable climatic conditions, and roof-mounted collectors for house heating in temperate climates have not been found to be economical because of the high cost of such collectors and their low temperature operation.

More advanced systems, such as the concentrating collector which has an expensive extruded Fresnel lens and which is mounted to track the sun about a fixed inclined axis yield higher temperature heat, but the cost and the required insulation of such systems are the drawbacks. Solar refrigeration using high-temperature collectors has long been desired, but economic problems and intermittent operation have resulted in use restricted primarily to experimental installations.

There remains a need for a relatively inexpensive yet efficient solar collector system that can be used in a wide range of climatic conditions.

SUMMARY OF THE INVENTION

The basic unit in the solar energy collection system of this invention is a relatively small reflective type concentrating radiant energy collector mounted to track, i.e. point at, the sun by movement about an azimuth and an elevation axis following the sun's daily movement. Preferably, a plurality of the collector units are mounted in an array for concurrent tracking about one common elevation axis, whereas each unit moves individually, but to the same extent about its own one of a plurality of parallel azimuth axes all generally perpendicular to the common elevation axis. In the presently preferred embodiment of the invention the common elevation axis is an insulated pipe which also serves to carry the collected heat from the collector units to its end use and the collector units are mounted in pairs, above and below this pipe, to pivot about an azimuth axis perpendicular to the pipe axis. The system can include a plurality of horizontal insulated pipes arranged parallel and connected to a common outlet and a common source of pressurized air.

Several alternative constructions for the individual collector units are shown, all of which have a cylindrical reflector to concentrate the radiant energy upon an internal heat transfer plate. The individual collector units are intended to be relatively inexpensive yet durable and easy to maintain.

Air, supplied by a blower at superatmospheric pressure, serves to supply power to the tracking mechanisms for both the elevation axis and the azimuth axis, serves as the support medium for the reflective film concentrators and serves as the heat transfer medium carrying the heat from the collector unit to its end use. The pressure of the air is regulated as it enters the collector unit and the flow of air is regulated in accordance with temperature as it exits the collector unit.

These and other features and advantages of the solar energy collector of the invention will be more fully understood from the following description of the preferred embodiments of the invention, especially when that description is read with reference to the several figures of the drawings.

BRIEF DESCRIPTION OF THE DRAWINGS

In the drawings, in which like reference numerals designate like parts throughout.

DETAILED DESCRIPTION OF THE PREFERRED EMBODIMENTS

Figure 1:
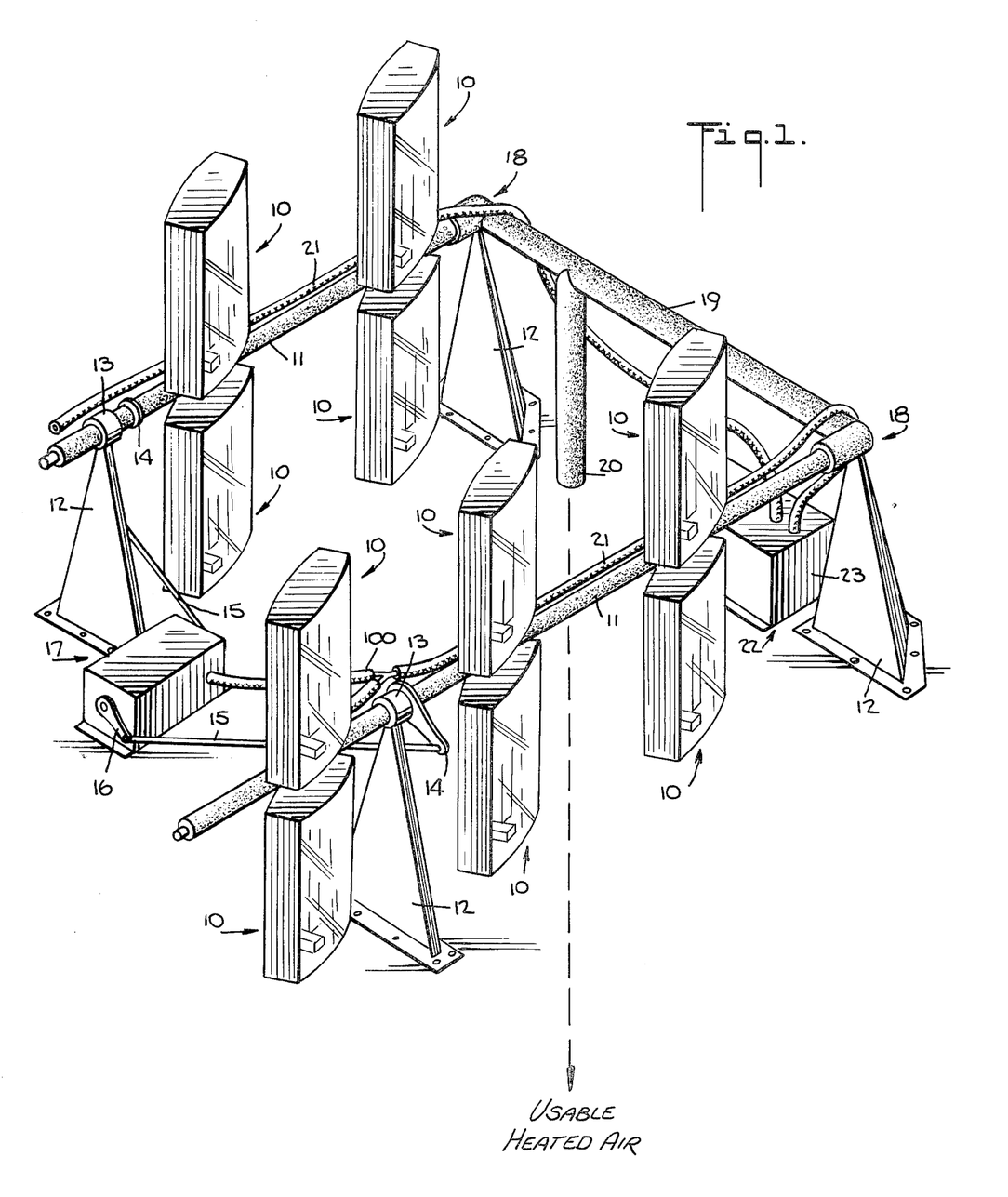
FIG. 1. is an isometric view of a solar collector array in an installation according to the invention.

FIG. 1 of the drawings shows part of an array of solar energy collector units individually generally designated by the reference numeral 10, ten of the collector units 10 being shown arranged in pairs. The collector units 10 are of the kind illustrated in greater detail in FIG. 3, but it should be understood that collector units of the kinds shown in FIGS. 4 and 5 could be arranged in a similar manner. The collector units 10 are mounted to pivot and turn to track or follow the position of the sun in the sky, always pointing at the sun to collect the maximum available radiant energy.

The collector units 10 of FIG. 1 are positioned in axially aligned pairs of units 10 on opposite sides of their supporting member 11, shown as a generally horizontal, insulated pipe which not only supports the units 10, but serves to convey heated air from the units 10.

Upright supports 12 for the pipe 11 are spaced at equal intervals, and the pipe 11 is free to rotate about its longitudinal axis in brackets or bearings 13 carried by the upright supports 13, allowing the pairs of collector units 10 to tilt in either direction from the generally vertical position illustrated in the drawing when the pipe 11 rotates. The units 10 are also rotatable about their own axes arranged perpendicular to the axis of the pipe 11. The mechanisms for actuating the movement of the collector units 10 about the two mutually perpendicular axes will be more fully described hereafter, but it will be noted that FIG. 1 shows each of the two pipes 11 of the collector system fitted with a bell crank 14, which is linked by an elongated rod or arm 15 to a driving crank 16 of an actuating mechanism generally designated by the reference numeral 17.

FIG. 1 shows part of an array of collector units 10 mounted on two supporting pipes 11, with the supporting pipes 11 communicating at their ends at 18 with a header conduit 19 for carrying heated air from the pipes 11 to an output line 20. It will be understood that like the pipes 11, the header 19 and output line 20 are insulated against heat loss to the atmosphere. The output line 20 could lead to an interior space to be heated in a space or house heating application or to some other service using hot air.

Each pipe 11 at its end point 18 is connected to the header 19 by a combination expansion and swivel joint not illustrated in detail to compensate for thermal elongation of the pipe 11 while permitting free rotation about the pipe axis for solar tracking.

Also shown in FIG. 1 are flexible lines 21 illustrated as hoses for feeding pressurized air to the several solar collector units 10. The flexible lines 21 generally follow the supporting pipes 11 to feed air to the collector units 10 near the points at which the units 10 are pivotally connected to the pipes 11, and the pressurized air is supplied to the flexible lines 21 from a source at 22, the housing 23 of which is shown. The housing 23 encloses and protects a blower for forcing air into the flexible lines 21 and through the entire system to exit at line 20. The blower is not illustrated in the drawings because it can be any high pressure blower of conventional design capable of delivering air at sufficient over-pressure to perform the required functions to be described. Air pressure of about 3 to 5 inches of water above the ambient pressure is presently believed to be preferable, but a higher pressure could be used if desired. The blower can be of the type driven by an electric motor sized to deliver about ¾ horsepower for each 1,000 square feet of solar collector surface.

The blower is preferably equipped with conventional air filters at its input side to clean the air and prevent the entrance of dust or the like which could clog or otherwise impair operation of the system.

Before discussing the various component parts of the solar energy collector system in detail, it should be emphasized that the arrangement of collector units 10 shown in FIG. 1 is primarily given by way of example, since various other arrangements of collector units 10, ranging from a few units to a large number could be employed according to the invention depending on the heat output desired and the limitations of available space, etc. Without limiting the generality of the foregoing, in a presently preferred embodiment of the invention the individual collector units 10 can have a collection surface area of about 7½ square feet each.

Figure 2:
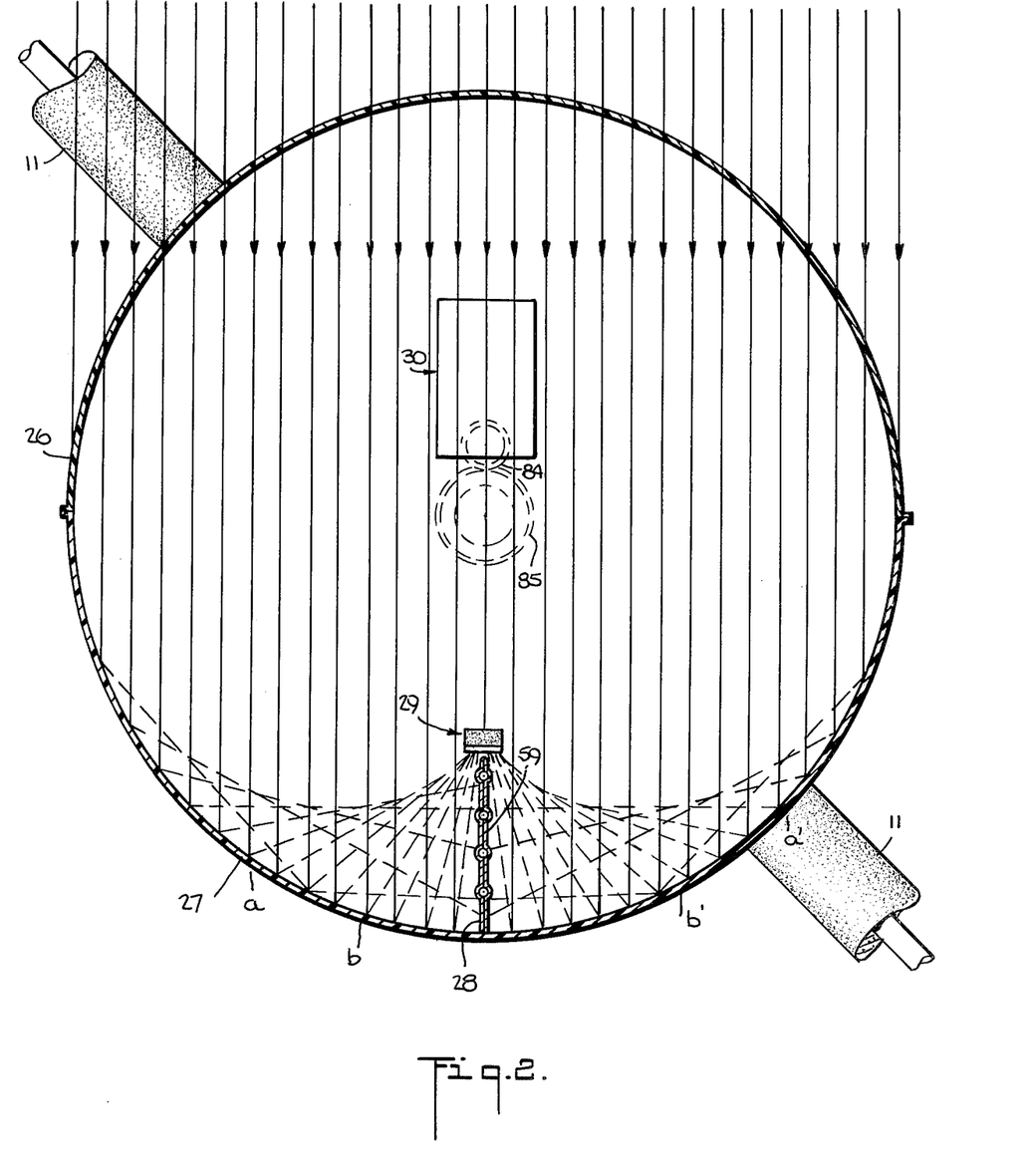
FIG. 2 is a sectional view of a cylindrical collector unit showing the pattern of reflection.
Figures 3, 4, 5, 6:
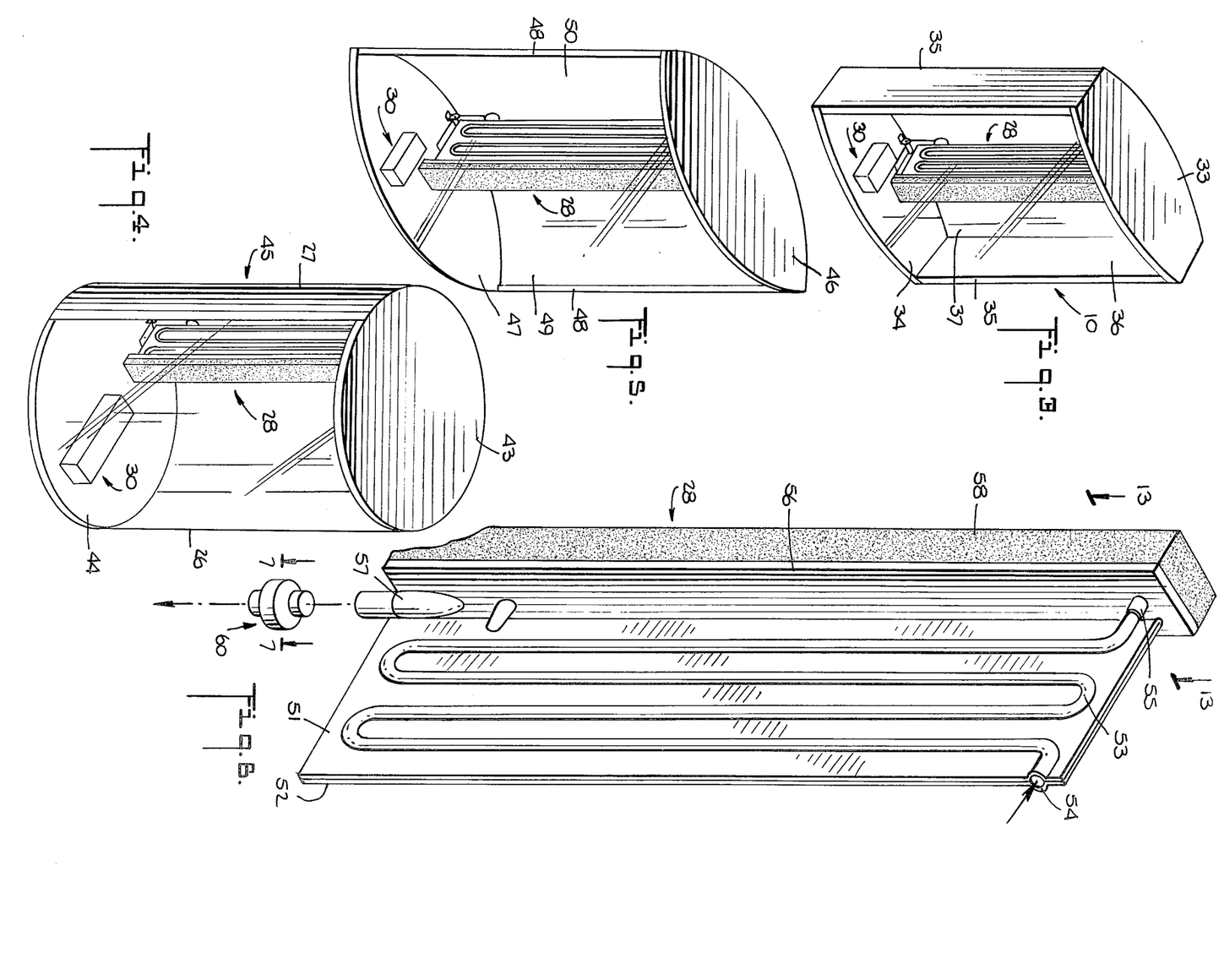
FIGS. 3–5 are isometric views of three embodiments of the solar energy collector unit of the invention.
FIG. 6 is an isometric view of a heat transfer plate of the solar collector unit of the invention.

Turning now to FIG. 2 the general principle of radiation concentration employed in the collector system of the invention is illustrated by a sectional view of a cylindrical collector unit of the type shown in FIG. 4. The cylindrical type of collector 45 is illustrated for simplicity, although another kind of collector (that shown in FIGS. 1 and 3) is presently particularly preferred. Rays of light are shown entering the collector of FIG. 2 from the top of the drawing through a transparent semicylindrical wall 26 to be reflected one or more times by a reflective semi-cylindrical wall 27 of the collector, and finally to impinge on the highly radiation absorptive material of a heat transfer element generally designated by reference numeral 28. The heat transfer element 28 will be discussed in greater detail in conjunction with the description of FIG. 6 of the drawing, but it will be seen in FIG. 2 that a tee portion 29 of the element 28 receives a large part of the incident radiation and that a body portion 59 of the element 28 also receives radiation. The collector unit is, of course, pointed at the sun so the parallel rays are evenly distributed in FIG. 2. In the cylindrical embodiment illustrated about 50% of the incident radiation, entering at the area near the middle of the collector, is directed to the tee section 29 of the heat transfer element 28, while about 36% of the incident radiation, at intermediate areas, is reflected singly to section 59 of the heat transfer element 28 and the remainder of the radiation, entering at the sides of the figure, is double reflected to the section 59.

FIG. 2 also shows the supporting pipe 11 in its relationship to the collector and the location of the azimuth tracking device 30 which will be more fully described in connection with FIGS. 9–11 of the drawings.

Three different embodiments of the collector units according to the invention are illustrated in FIGS. 3, 4 and 5, the preferred unit 10 being shown in FIG. 3 and the cylindrical unit being shown in FIG. 4. In each of these three embodiments there is a heat transfer element 28 of the type shown in FIG. 6. In each pair of collectors as illustrated in FIG. 1 there is an azimuth tracking mechanism 30 in accordance with FIGS. 9–11. All three types of collector unit can be employed in arrangements of the type shown in FIG. 1 for allowing the daily movements of the sun.

The collector units of FIGS. 3–5 all have transparent fronts, i.e. sun-facing, surfaces and reflective rear surfaces for concentrating the solar energy by reflection to the heat transfer elements 28. The reflective surface is preferably of flexible plastic film which has been treated with a highly reflective material such as vacuum deposited aluminum. Air pressure within the collector units keep the walls taught and wrinkle-free so as to be unaffected by wind forces. This is especially important in the case of the reflective film.

The several embodiments of FIGS. 3–5 show different ways in which such collectors may be constructed. The major difference between these constructions is the various portions of the reflective pattern utilized and the concentration ratio which results. It will be understood that some other form of collector unit could be employed in a similar method.

FIG. 3 shows a collector unit 10 which has a rigid frame formed of a top 33, a bottom 34 and two side members 35. As in the collector units of FIGS. 4 and 5 the front wall 36 is transparent and the rear wall 37 is reflective. In this collector unit 10 the plastic films forming the walls 36 and 37 are independently affixed to the frame elements in an air-tight manner.

This collector unit 10 illustrates the even higher concentration ratio available by utilizing a smaller portion of the reflective pattern shown in FIG. 2. In this case the portion of the reflective pattern utilized is represented by the arc b–b' of FIG. 2. By tracing the reflected rays it can be seen that all of the reflected energy is concentrated upon the back side of the portion 29 of the heat transfer member 28 resulting in an even smaller proportional area than in the case of a semi-cylindrical reflector and a consequent increase in the overall concentration ratio. It should be understood that all of the collector units shown in FIGS. 3-5 are of the same width and that the reference to the various portions of the reflective pattern of FIG. 2 must be reproportioned to the same total width of the collector unit.

Due to its higher concentration ratio, the embodiment of FIG. 3 is presently particularly preferred, but the other embodiments of collector units shown in FIGS. 4 and 5 seem to illustrate some of the possible modifications which may be desired for particular installations.

The generally cylindrical collector unit 45 of FIG. 4 has a rigid disc-shaped top 43 and a similar rigid bottom disc 44 to which the reflective material coated film forming the back wall 27 and the clear film forming the front wall 26 are secured in an air-tight manner, the two semi-cylindrical portions 26 and 27 being joined at their edges as shown in FIG. 2.

This cylindrical collector unit 45 utilizes the full reflective pattern as shown in FIG. 2 and exhibits a relatively low concentration ratio as a result. This relatively low concentration ratio results from the fact that, as is evident in FIG. 2, the area of the heat transfer element 28 is large compared to the total area presented to the sun's rays.

The collector unit of FIG. 5 has a rigid top 46 and bottom 47 secured to side frame members 48 to complete the frame. As in the collector unit of FIG. 3, the front wall 49 and the rear wall 50 of the collector unit of FIG. 5 are formed of transparent and reflective sheets of plastic film respectively, joined at their edges, and air-tightly secured to the top and bottom members 46 and 47. Preferably the pieces 49 and 50 are first joined together and then fitted over the frame.

In the collector unit of FIG. 5 only a portion of the reflective pattern is utilized. The portion of the reflective pattern utilized is approximately represented by the arc a-a' as shown in FIG. 2. By tracing the reflected rays it is evident that such a collector unit requires less area on the heat transfer element 28 thus increasing its overall concentration ratio when compared to the full cylindrical collector unit 45 of FIG. 4.

The heat transfer element 28 of FIG. 6 is positioned within the collector units of FIGS. 3, 4 and 5 to receive the maximum amount of reflected energy as exemplified in the preceeding discussion. The relative dimensions of the element 28 will, of course, depend upon the configuration of the reflective surface of the collector unit, and may, in the extreme, be no more than the portion 29 thereof.

As shown in FIG. 6, the heat transfer element comprises a pair of rigid, generally rectangular plates 51 and 52 having aligned opposed recesses in their facing surfaces defining a serpentine passage 53 for the flow of air between the plates 51 and 52. An air inlet to the passage 53 is shown at 54 and heated air exits from the passage 53 at 55.

Perpendicular to and secured at intervals to the longitudinal edges of the plates 51 and 52 remote from the inlet 54 is an elongated heat absorption tee member 56 having an internal passage (not shown) from the end 55 of the passage 53 to the hot air outlet at 57. The surfaces of the plates 51 and 52 and of the tee member 56 should be coated black for increased absorption of radiant energy. To prevent re-radiation of energy from the front, sun facing, surface of the tee section 56, there is a layer of insulation material 58 in intimate contact therewith. The choice of materials and coatings for maximum absorption of the incident energy will be understood by those familiar with the art.

Figure 7:
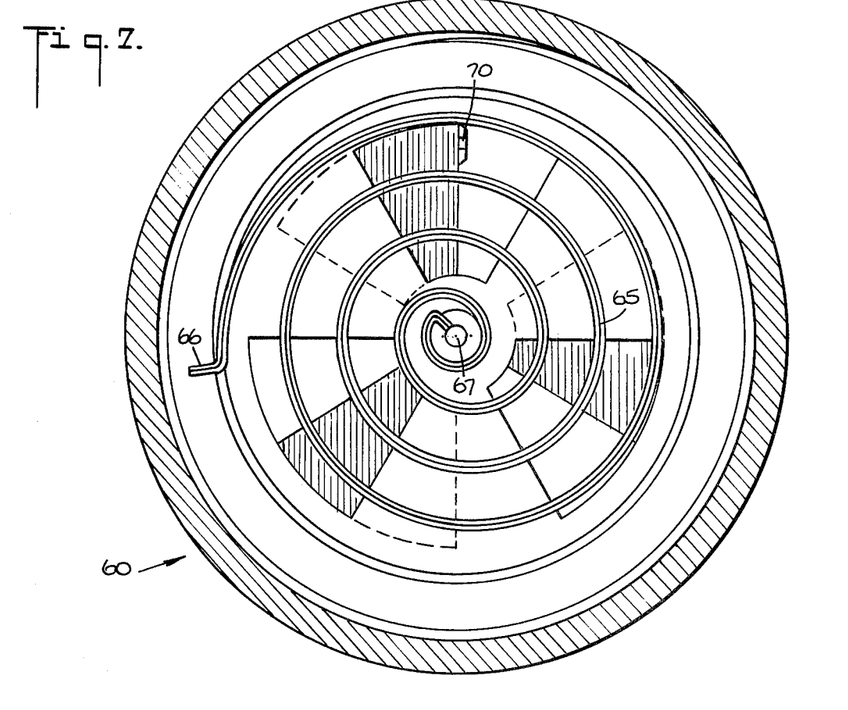
FIG. 7 is a view taken along line 7—7 of FIG. 6 and looking in the direction of the arrows showing an air flow regulator for use in conjunction with the collector units of FIGS. 3–5.
Figure 8:
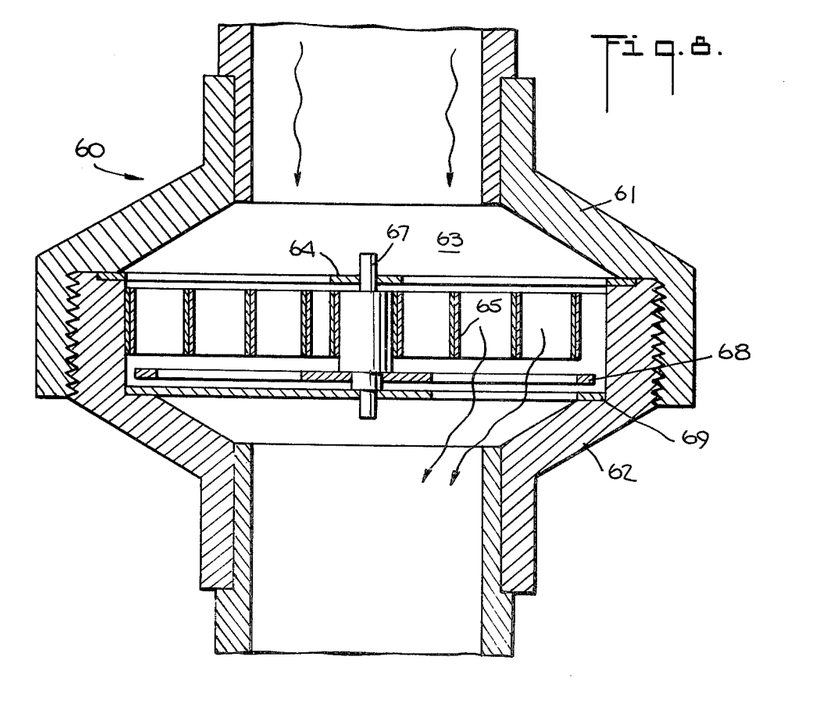
FIG. 8 is a sectional view taken perpendicular to that of FIG. 7.

FIGS. 7 and 8 illustrate an air flow regulator 60 mounted at the air outlet 57 as shown in FIG. 6 for controlling the exit of air from the heat transfer element 28 in response to air temperature changes. At low air temperatures the regulator 60 allows a low rate of air flow, but at high temperatures, the regulator 60 opens to allow more rapid air flow, thus tending to provide a flow of air at uniform temperature from the system. The regulator 60 has a housing shown as formed in two parts 61 and 62, defining an inner chamber 63. Extending across the chamber 63 is a fixed bearing plate 64 with passages for the flow of air to a bimetallic spiral 65 which is secured at its outer end 66 to the housing part 62 and at its inner end to a pivot pin 67 rotatably mounted in the center of the bearing plate 64. The pivot pin 67 is secured through the center of a rotatable valve plate 68 and rotatably fitted in a fixed valve plate 69. The valve plates 68 and 69 have openings which are in registry when the regulator 60 is fully open, and not aligned when the regulator is in the closed condition. The expansion of the bimetallic spiral 65 in response to a rise in temperature rotates the valve plate 68 toward its opened position. The space between the plates 68 and 69 allows some air leakage at all times so there is always some flow of air through the system. Preferably the bimetallic spiral is constructed to rotate the valve plate 68 to open when the air temperature reaches about 300° F. A stop member 70 for preventing excessive rotation is shown in FIG. 7.

Figures 9, 10, 11:
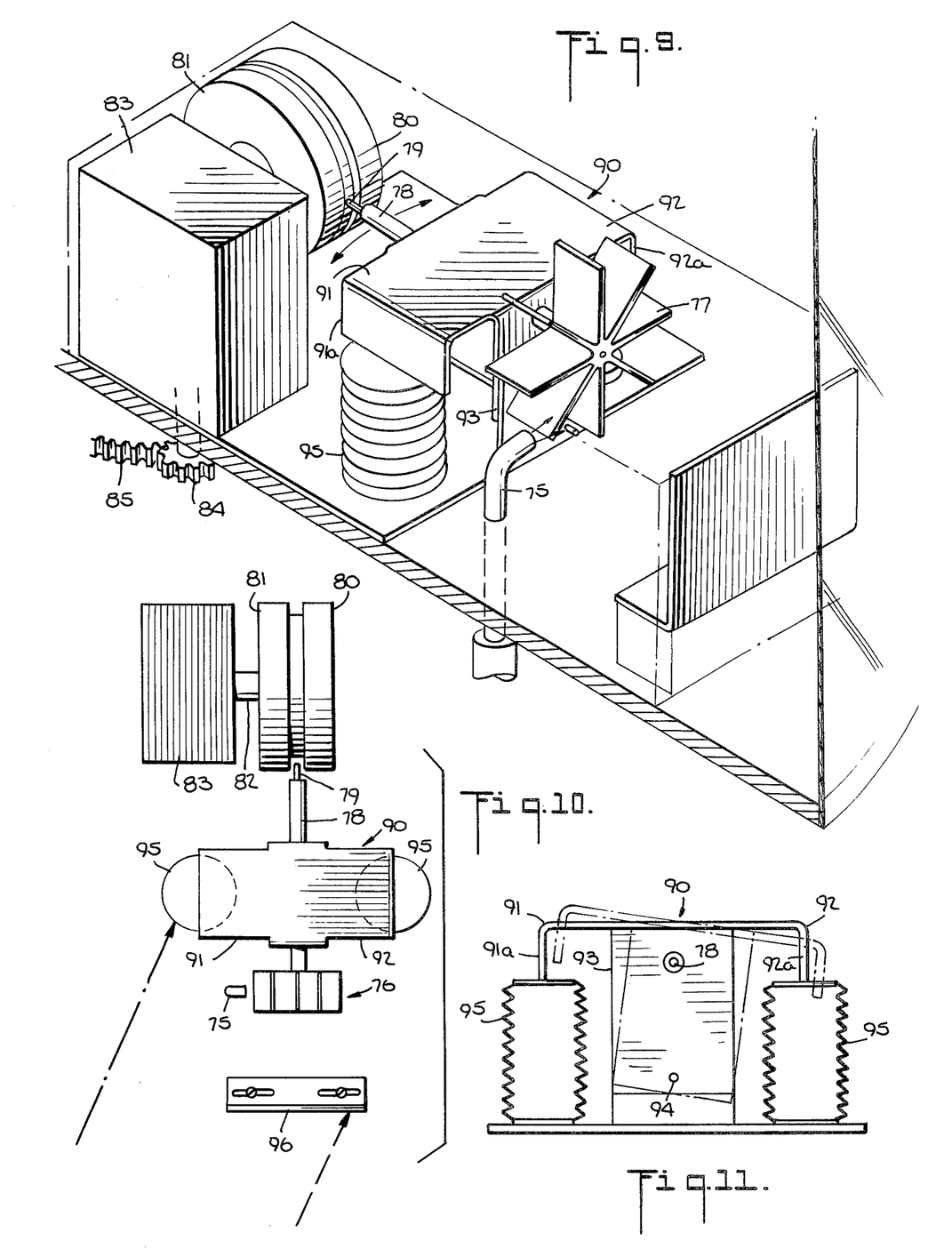
FIG. 9 is an isometric view of an azimuth tracking device according to the invention.
FIG. 10 is a top plan view of the tracking device of FIG. 9.
FIG. 11 is a detail view showing the operation of a rocker of the tracking device of FIGS. 9 and 10 when the collector unit is not pointed directly at the sun.

FIGS. 9-11 show the azimuth tracking device 30 of the invention. The actuating mechanism 17 of FIG. 1 for changing the angle of elevation of the collector units 10 corresponds in function to the device 30 and can be of similar structure, though more powerful than the device 30, so the following description of the azimuth tracking mechanism also serves to describe the elevation changing device 17. As pressurized air enters each collector unit through the air feed hose 21, the air is directed through the pressure regulator, described in greater detail in conjunction with FIG. 12, and then through a nozzle 75 to operate the azimuth tracking device 30 as shown in FIGS. 9 and 10. The device 30 comprises a turbine 76 having flat vanes 77 mounted to spin under the forces of air from the nozzle 75, imparting rapid rotation to a shaft 78. In the condition shown in Fig. 9 the turbine shaft 78 spins freely, but transverse movement of the shaft 78 will bring an end portion 79 of the shaft 78 into engagement with one of two discs 80 or 81 spaced on opposite sides of the shaft end 79 for rotation thereby when the shaft 79 is in contact therewith. The discs 80 and 81 are mounted on the input shaft 82 of a transmission 83 with a high speed reduction ratio. It will be clear that engagement of the shaft end 79 with the disc 80 will turn the disc 80 counterclockwise when viewed from lower left, whereas contact of the shaft end 79 with the disc 81 will rotate that disc clockwise as shown in FIG. 9. Thus when the turbine shaft 78 is displaced from the centered position of FIGS. 9 and 10 the bidirectional clutch comprising the discs 80, 81 and their shaft 82 will drive the transmission in either of two opposite directions. When so driven, the transmission 83, through an output gear 84 will tend to revolve around a fixed gear 85. The gear 85 is secured at the pivot point of the collector unit as shown in FIG. 2 and the gear 84 by riding around the fixed gear 85 carries the collector unit on which the tracking device 30 is mounted, in rotating movement around the axis of the collector unit.

The position of the turbine shaft 78 with respect to the bidirectional clutch discs 80 and 81, and hence the direction of rotation of the collector unit, is responsive to the orientation of the device 30 and collector toward the sun. The turbine shaft 78 is carried by and rotatably mounted in a rocker element 90 which has arm portions 91 and 92 extending in opposite directions from the axis of the shaft 78 and terminating in downwardly extending portions 91a and 92a respectively. The rocker element 90 has a base 93 mounted on a pivot 94 as shown best in FIG. 11 and can accordingly rock like a seesaw about the pivot 94, lowering the arm 91 while raising arm 92 or vice versa. Beneath the arms 91 and 92 are a pair of identical bellows 95 containing a medium such as gas which expands when heated. Upon expansion either bellows 95 will push upward and tip the rocker 90, bringing the turbine shaft 78 into driving contact with the bidirectional clutch element 80 or 81 and thereby rotating the collector about its axis. The bellows 95 are ordinarily shaded from the sun's rays, or exposed to equal radiation when the collector is pointed at the sun, radiation heats one bellows element 95 more than the other, as shown by the dashed arrows in FIG. 10, expanding the warmer bellows element 95 and tipping the rocker 90 as shown in dashed lines in FIG. 11. This action actuates the working parts of the tracking device 30 to its previously described operation.

The elevation tracking mechanism 17 fed with air under pressure by a hose 100 connected to the hose 21 operates similarly to the device 30, moving the crank arm 16 and its associated linkage one way or the other to rotate the pipe 11.

Figures 12, 13:
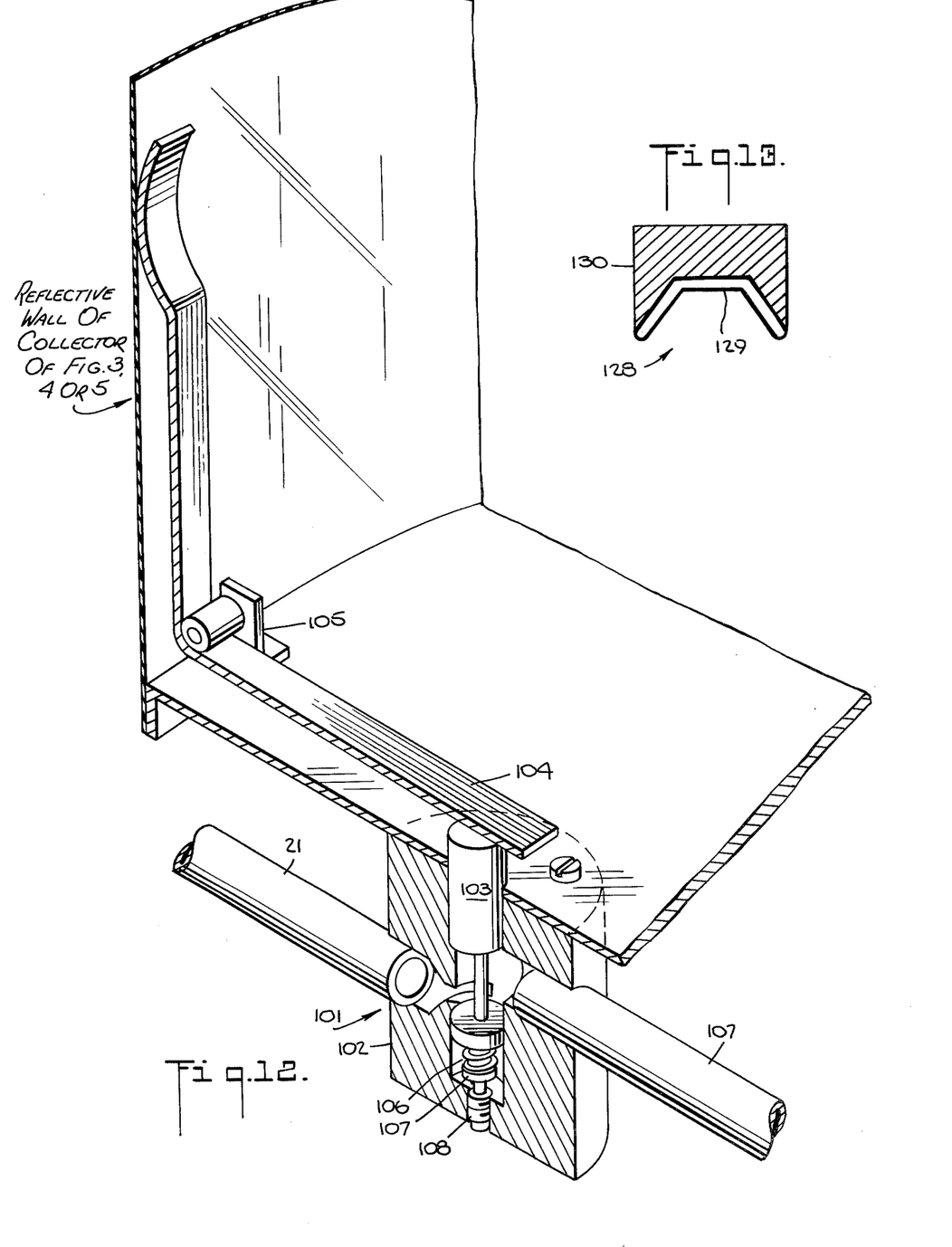
FIG. 12 is a partially cut-away isometric view of the pressure regulator according to the invention.
FIG. 13 is a cross sectional view taken along line 13—13 of FIG. 6 and looking in the direction of the arrows showing an alternate configuration of the heat transfer plate in accordance with the invention.

The pressure regulator 101 illustrated in FIG. 12 utilizes the reflective plastic film 27 (or 37 or 50), forming the collector unit rear wall as a pressure sensing membrane and controls the pressure within the collector unit by regulating the inlet air. The regulator 101 consists of a regulator body 102, a spool valve 103, a motion transfer arm 104 pivoted at pivot point 105, and an adjustable spring 106, with its associated spring seat 107 and adjusting screw 108. The air is introduced through hose 21 from the blower, modulated by spool valve 103 and passed out of the regulator through hose 107 to the nozzle 75 as shown in FIG. 10. When there is no air introduced, as when the system is shut down, the reflective plastic film 27 (or 37 or 50) is relaxed and moves the motion transfer arm 104 toward the center of the collector unit. This action causes the spool valve 103 to compress the spring 106 and fully open the passage between the inlet and the outlet of the regulator. As air is introduced upon energizing the system the collector begins to inflate and the plastic film is stretched into its desired shape for reflecting the sun's rays upon the heat transfer element 28. The regulator prevents overpressurization by closing the port between inlet and outlet as the plastic film 27, 37 or 50 approaches the correct position by the motion transfer arm 104 allowing the spool valve 103 to move upward under the effect of the spring 106. In order to individually adjust the reflector to its correct shape the spring 106 is seated upon an adjustable seat 107 which, in turn, may be adjusted by movement of the adjusting screw 108.

FIG. 13 illustrates a modified form of heat transfer element tee sections generally designated 128, which has a profile different from the heat transfer element 28. The element 128 is particularly effective when used in the collector unit 10 of FIG. 3, but may be used in other collector units. As is evident from the reflective pattern shown in FIG. 2 the trough like cross section 129 of the element 128 will allow the reflected rays to strike the heat transfer element at more direct angles. The insulating material 130 shown in FIG. 13 serves the same purpose as the insulation at 58 in FIG. 6.

The operation of the system can be understood by following the flow of air through the entire cycle. Cool air enters, is filtered and driven by the blower through the hose 21 to the individual collector units 10 (or those of FIG. 4 or 5) passing through the pressure regulator 101 first and then to the nozzle 75 for driving the turbine 76. The air is then released into the interior of the air-tight collector unit where it inflates the front plastic film 26 and the reflective plastic film 27 (or the corresponding films of the units of FIGS. 4 and 5). Within the collector the air speed is very low and it is thus partially heated by the greenhouse effect as it makes its way toward the inlet 54 of the heat transfer element 28. Once entering the heat transfer element 28 the air is heated by the concentrated energy being absorbed by the heat transfer element and exits at greatly elevated temperature. It will be noted that the reflected radiation is more intense close to the tee section 29 of the heat transfer element 28 in FIG. 2, and most intense at the tee section 29. This results in efficient heat transfer by providing the maximum temperature differential when the air is at its highest temperature.

After being heated, the air passes through the flow regulator 60 which attempts to maintain constant exit temperature by slowing down the flow if this temperature is not sufficient and speeding up the flow as it approaches the correct value of approximately 300° F. Slowing the air flow allows the temperature to increase because there is more time for the available energy to heat the air within the heat transfer element 28.

Air passing out through the pipes 11, 19 and 20 is accordingly at a substantially uniform temperature, allowing any equipment associated with the system to operate at maximum efficiency.

Because of its simple yet effective all-pneumatic provision for tracking, inflating to shape and transferring heat, the collector system of the invention is attractive for use over a wide range of latitudes and climatic zones. Relatively large energy yields will be evident for a small investment due to the high overall collection efficiency and the low system cost.

It will be understood that various modifications and alterations can be made in taking advantage of the concepts of this invention. For example, combinations of concepts of this invention with other state of the art methods such as single or double axis electronic tracking, computer controlled tracking, hydronic heat transfer or combinations of other types of collectors would all be within the scope of the invention. In particular, the substitution of other heat responsive elements for the gas filled bellows in the tracking system would be an obvious modification to those skilled in the art and should be considered within the spirit and scope of this invention.

What is claimed is:

1. A solar energy collector wherein circulating air is heated in a heat transfer element by concentrated radiation from a cylindrical reflector maintained in shape by air pressure and having means for tracking the sun powered by said circulating air.

2. The solar energy collector of claim 1 and including a temperature responsive valve in a conduit for leading air heated in said heat transfer element away from the collector for use as a heating medium.

3. A solar energy collector system comprising a plurality of radiation concentrating inflatable collector units mounted for rotation about a common axis to follow the motion of the sun perpendicular to said common axis, said collector units also being rotatable about an axis of each collector unit for following the movement of the sun parallel to said common axis, and including blower means for supplying air to said collector units for inflation of the units, each collector unit having a heat transfer element for heating air before air exits from the unit.

4. The solar energy collector system of claim 3 and including pneumatically actuated means for rotating said collector units.

5. The solar collector system of claim 3 wherein air is heated by reflected radiation within said collector units and said collector units are mounted on a conduit for heated air, which conduit lies along said common axis of rotation.

6. The solar energy collector system of claim 3 wherein said heat transfer element is generally tee shaped and has an internal passage within which air is heated by reflected radiation, and means for conducting air to be heated to said heat transfer element under pressure, and means for leading air under pressure to and through means for causing rotation of said collector units.

7. The solar energy collector system of claim 3 and including means for sensing the position of the sun and pneumatic actuation means coupled to said sensing means for rotating said collector units to point at the sun.

8. A solar energy collector system comprising a sun sensor which includes a bidirectional clutch and an air powered turbine for driving said clutch, and means for selectively coupling said turbine with said clutch to actuate tracking motion of said solar collector when solar radiation is incident upon said sun sensor at an angle different from a predetermined angle.

9. The solar energy collector system of claim 8 wherein said sun sensor includes bellows expansible upon heating to cause coupling of said turbine with said clutch.

10. A solar energy collector unit comprising a heat transfer element having a passage for the flow of a fluid therethrough, a reflector surface constituted by a substantially uniformly thin smooth sheet of flexible film serving as a wall of a housing for said heat transfer unit, as well as for reflection of radiation to said heat transfer element, such surface being cylindrically curved and maintained in shape by differential air pressure to concentrate said reflected radiation toward a concave portion of said heat transfer element, said housing also comprising a flexible transparent film front wall and a frame member all in air tight relationship, wherein said flexible walls are inflated and held in shape by air pressure supplied by blower means and controlled by an air pressure regulator, said air pressure regulator utilizing the position of said reflective film to control the pressure, and a sun sensor means for rotating the collector to follow the position of the sun.

11. An array of concentrating solar collector units for heating air by reflecting solar radiation to heat transfer elements within which a stream of air under pressure flows, blower means for driving said air under pressure to said heat transfer elements and to tracking means for rotating said collector units in sun following movement about their own axes whereby air to be heated is employed to actuate said tracking means.

12. The arrangement of claim 11 wherein said collector units are mounted on conduit means for rotation about the conduit means axis and for flow of heated air from said collector units to and through said conduit means.

13. The arrangement of claim 11 wherein air is led to said collector units through flexible hose means from said blower means.

14. The arrangement of claim 11 wherein said collector units are pivotably mounted in pairs on elongated conduit means for rotation of said collector units about an axis of said conduit means as well as for rotation of said collector units about their own axes for said sun following movement.

15. The arrangement of claim 11 including a plurality of generally horizontal pipes mounted for axial rotation, said collector units being pivotably mounted in pairs on opposite sides of said horizontal pipes, said pipes being connected to a common header for carrying heated air from said collector units.

* * * * *

UNITED STATES PATENT AND TRADEMARK OFFICE
CERTIFICATE OF CORRECTION

PATENT NO. : 4,175,540

DATED : November 27, 1979

INVENTOR(S) : William J. Roantree; Paul S. Bartini

It is certified that error appears in the above-identified patent and that said Letters Patent are hereby corrected as shown below:

Col. 2, Line 65,

"the upright supports 13" should be

--the upright supports 12--.

Col. 4, Line 35, last word "allowing" should be --following--.

Signed and Sealed this

First Day of April 1980

[SEAL]

Attest:

SIDNEY A. DIAMOND

Attesting Officer

Commissioner of Patents and Trademarks